United States Patent
Luber et al.

(10) Patent No.: US 11,003,311 B2
(45) Date of Patent: May 11, 2021

(54) DEVICE ACCESS SOFTWARE WITH CHANGEABLE DISPLAY MODE

(71) Applicant: Endress+Hauser Process Solutions AG, Reinach (CH)

(72) Inventors: Werner Luber, Allschwil (CH);
Ingomar Sotriffer, Gundelfingen (DE);
Michael Mayer, Oberwil (CH); Jan Pflug, Basel (CH)

(73) Assignee: Endress+Hauser Process Solutions AG, Reinach (CH)

( * ) Notice: Subject to any disclaimer, the term of this patent is extended or adjusted under 35 U.S.C. 154(b) by 0 days.

(21) Appl. No.: 16/089,644

(22) PCT Filed: Mar. 20, 2017

(86) PCT No.: PCT/EP2017/056575
§ 371 (c)(1),
(2) Date: Sep. 28, 2018

(87) PCT Pub. No.: WO2017/186409
PCT Pub. Date: Nov. 2, 2017

(65) Prior Publication Data
US 2019/0056849 A1    Feb. 21, 2019

(30) Foreign Application Priority Data
Apr. 25, 2016 (DE) .................... 10 2016 107 643.0

(51) Int. Cl.
*G06F 3/0481* (2013.01)
*G06F 3/0482* (2013.01)
(Continued)

(52) U.S. Cl.
CPC ......... *G06F 3/04817* (2013.01); *G05B 19/00* (2013.01); *G06F 3/0481* (2013.01);
(Continued)

(58) Field of Classification Search
None
See application file for complete search history.

(56) References Cited

U.S. PATENT DOCUMENTS 9,043,714 B1 * 5/2015 Queru ................. A63F 13/2145
715/765
10,268,338 B2 * 4/2019 Sirpal .................... G06F 1/1616
(Continued)

FOREIGN PATENT DOCUMENTS

| DE | 202006005761 U1 | 7/2006 |
| DE | 102013109213 A1 | 2/2015 |
| DE | 102014108126 A1 | 12/2015 |

OTHER PUBLICATIONS

Search Report for German Patent Application No. 10 2016 107 643.0, German Patent Office, dated Sep. 14, 2016, 7 pp.

*Primary Examiner* — Chad M Dicke
(74) *Attorney, Agent, or Firm* — Kelly J. Smith; Endress+Hauser (USA) Holding Inc.

(57) ABSTRACT

Described is a method for changing the display mode of a device access software with which components of a fieldbus system can be accessed. The device access software includes a frame application and at least one software component integrated into the frame application, wherein between the frame application and the at least one software component an interface is provided. The method includes switching the frame application from a first display mode into a second display mode different from the first display mode and changing at least one parameter in the software components via the relevant interface, wherein the change of the at least one parameter effects a switching of the display mode from the first display mode into the second display mode.

19 Claims, 4 Drawing Sheets

(51) Int. Cl.
*G06F 3/0488* (2013.01)
*G05B 19/00* (2006.01)

(52) U.S. Cl.
CPC .......... *G06F 3/0482* (2013.01); *G06F 3/0488* (2013.01); *G05B 2219/31132* (2013.01)

(56) References Cited

U.S. PATENT DOCUMENTS

| | | | |
|---|---|---|---|
| 10,275,427 B2* | 4/2019 | Saptharishi | G10L 15/1815 |
| 10,327,723 B2* | 6/2019 | Kim | A61B 6/54 |
| 2002/0103642 A1* | 8/2002 | Asada | G06F 9/454 |
| | | | 704/231 |
| 2002/0111933 A1* | 8/2002 | Noble | G06F 17/211 |
| 2007/0079250 A1* | 4/2007 | Bump | G05B 23/0216 |
| | | | 715/762 |
| 2009/0199120 A1* | 8/2009 | Baxter | G06F 3/0482 |
| | | | 715/765 |
| 2010/0114334 A1* | 5/2010 | Krumsiek | G05B 19/042 |
| | | | 700/3 |
| 2010/0250816 A1* | 9/2010 | Collopy | G06F 1/1616 |
| | | | 710/303 |
| 2011/0193806 A1* | 8/2011 | Kim | G06F 1/1641 |
| | | | 345/173 |
| 2012/0185065 A1 | 7/2012 | Fujii | |
| 2012/0297341 A1* | 11/2012 | Glazer | G06F 8/30 |
| | | | 715/810 |
| 2013/0162515 A1* | 6/2013 | Prociw | G06F 1/1616 |
| | | | 345/156 |
| 2014/0002470 A1* | 1/2014 | Makower | G06F 16/40 |
| | | | 345/581 |
| 2014/0359458 A1 | 12/2014 | Smith et al. | |
| 2015/0138094 A1* | 5/2015 | Kim | G06F 1/1632 |
| | | | 345/168 |
| 2017/0018578 A1* | 1/2017 | Yamazaki | H01L 27/1225 |
| 2017/0078504 A1* | 3/2017 | Nagata | G06F 8/38 |
| 2017/0200748 A1* | 7/2017 | Yamazaki | G09G 3/20 |
| 2017/0230617 A1* | 8/2017 | Dunn | G09B 5/067 |

* cited by examiner

DEVICE ACCESS SOFTWARE WITH CHANGEABLE DISPLAY MODE

CROSS-REFERENCE TO RELATED APPLICATIONS

The present application is related to and claims the priority benefit of German Patent Application No. 10 2016 107 643.0, filed on Apr. 25, 2016 and International Patent Application No. PCT/EP2017/056575 filed on Mar. 20, 2017, the entire contents of which are incorporated herein by reference.

TECHNICAL FIELD

The invention relates to a method for changing the display mode of a device access software, with which components of a fieldbus system can be accessed. Furthermore, the invention relates to a device access software, with which components of a fieldbus system can be accessed.

BACKGROUND

In automation technology, field devices are often used, which serve for registering and/or influencing process variables. Examples of such field devices are fill level measuring devices, mass flow measuring devices, pressure- and temperature measuring devices, etc., which as sensors register the corresponding process variables, fill level, flow, pressure, and temperature.

Parametering, configuration and state monitoring of the field devices of a fieldbus system occurs, as a rule, by means of device access software installed in a host. As a rule, the device access software includes a plurality of drivers, with which the components of the fieldbus system can be accessed. Via the user interfaces of the drivers integrated into the device access software, the user can make inputs from the host and set or change parameter values. In such case, it would be advantageous to be able to switch the device access software between different display modes as a function of external conditions or user input.

SUMMARY

It is an object of the invention to simplify switching between different display modes of device access software.

The object is achieved by the features set forth in claims 1 and 17.

Advantageous further developments of the invention are set forth in the dependent claims.

A method in accordance with forms of embodiment of the invention serves for changing the display mode of a device access software, with which components of a fieldbus system can be accessed. The device access software includes a frame application and at least one driver- or application software component integrated into the frame application, wherein between the frame application and the at least one driver- or application software component, in each case, an interface is provided. The method includes the switching of the frame application from a first display mode into a second display mode different from the first display mode and the changing of at least one parameter in at least a part of the driver- or application software components via the relevant interface, wherein the changing of the at least one parameter effects a switching of the display mode from the first display mode into the second display mode in at least one driver- or application software component of the part of the driver- or application software components.

In accordance with this method, thus, in each case, when the display mode of the frame application is switched from a first to a second display mode, at least one parameter is changed via the interface between frame application and drivers, so that the drivers are informed of the change of the display mode of the frame application. On the part of the drivers, then the display mode can be switched correspondingly to the frame application, to the extent that the drivers support these display modes.

In the case of a device access software, a number of different driver- and application software components from different manufacturers are integrated into a frame application, so that the device access software represents a heterogeneous software environment. By the above described method, the changing of parameters via a predefined interface achieves that a coordinated switching between different display modes can be performed in this heterogeneous environment. This is, for example, even possible when different driver- and application software components from different manufacturers interact. In this way, a joint switching of the display mode in the display regions of the frame application and the drivers is achieved on the graphical user interface of the device access software. In this way, the presentation of data on the graphical user interface can be matched to changed environmental conditions and to changed requirements. For example, the display of data can either occur in a touch mode with a layout suitable for touch operation or in a non-touch mode suitable for conventional input by means of keyboard and mouse. By coordinated switching between different display modes, user-friendliness is improved, because user input is facilitated by the opportunity for adapting to different conditions and requirements.

The switching between different display modes can be performed either manually via suitable buttons of the graphical user interface or automatically as a function of predefined events. When the matching of the display mode to environmental conditions occurs automatically, such is especially convenient for the user.

A device access software in accordance with forms of embodiment of the invention for accessing components of a fieldbus system includes a frame application and at least one driver- or application software component integrated into the frame application, wherein between the frame application and the at least one driver- or application software component, in each case, an interface is provided. The frame application is switchable between a first display mode and a second display mode different from the first display mode. The frame application is embodied, in the case of a change of the display mode, to change at least one parameter in at least a part of the driver- or application software components via a relevant interface, wherein the change of the at least one parameter effects a switching of the display mode from the first display mode into the second display mode in at least one driver- or application software component of the part of the driver- or application software components.

BRIEF DESCRIPTION OF THE DRAWING

The invention will now be explained in greater detail based on examples of embodiments illustrated in the drawing figures as follows.

DETAILED DESCRIPTION

Figure 1:
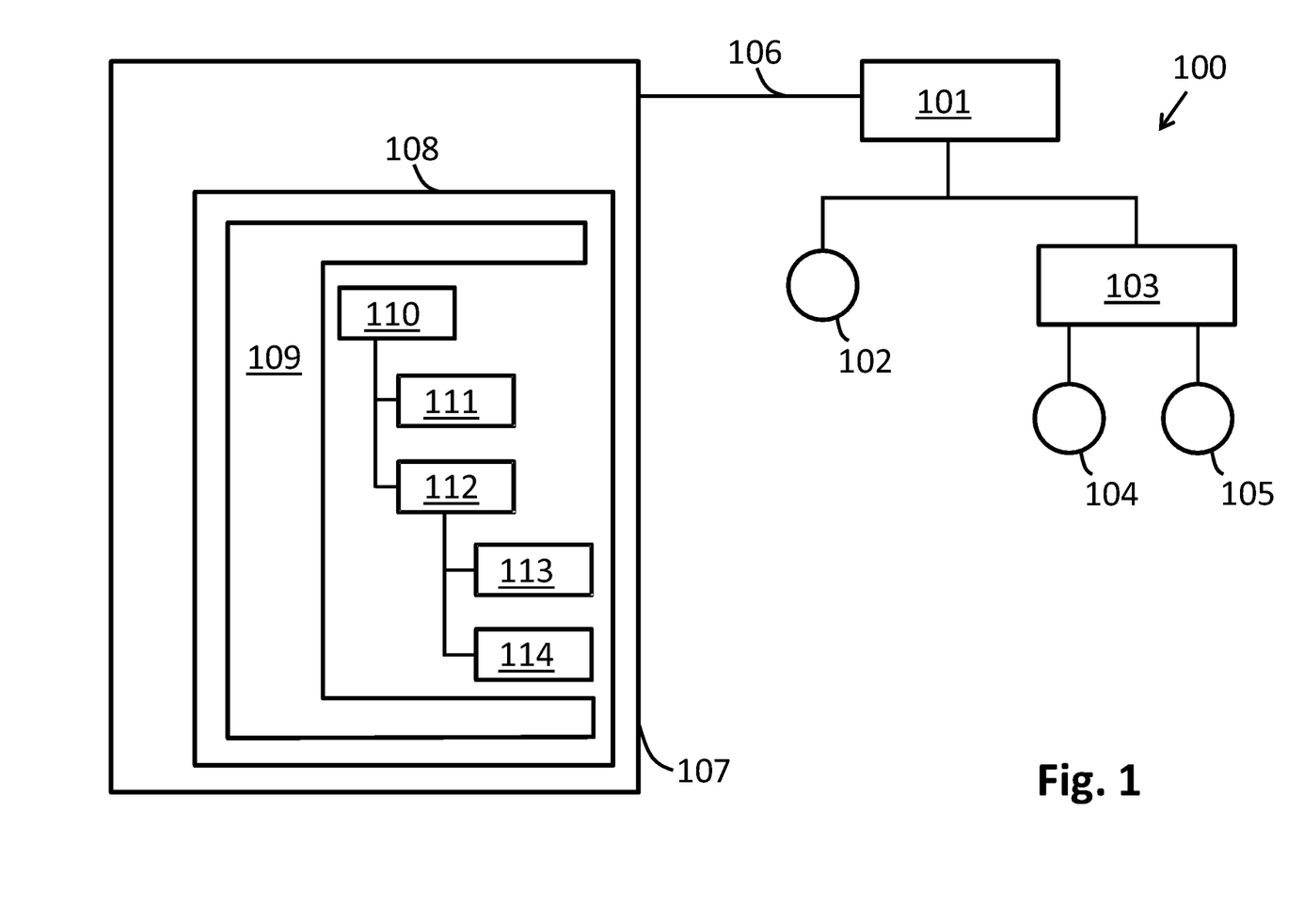
FIG. 1 shows a fieldbus system together with an associated device access software, which includes a frame application and a plurality of drivers integrated into the frame application.

FIG. 1 shows a fieldbus network 100 with a plurality of hierarchically arranged, fieldbus segments. The fieldbus network 100 includes a field access device 101, a field device 102 as well as a gateway 103. Connected to the gateway 103 are the two field devices 104, 105.

Connected to the field access device 101 via an Ethernet connection 106 is a host 107, in which a device access software 108 is installed. Via the device access software 108, the components of the fieldbus network 100 can be configured and parametered from the host 107. Especially, the parameters of the different components of the fieldbus network 100 can be read-out, displayed and changed using the device access software 108. The data exchange required for these tasks is, as a rule, conducted via so-called acyclic data traffic.

In order to be able to correctly access the different components of the fieldbus network 100, the device access software 108 requires information concerning the properties and parameters of the field devices, gateways, remote I/Os, etc. of the fieldbus network 100. This information is provided by the manufacturers of the different devices, as a rule, in the form of device description files or device drivers. For device description for acyclic data exchange in the case of the fieldbus protocols, Profibus-DP, Profibus-PA, Fieldbus Foundation and HART, device descriptions according to the standards DTM (Device Type Manager), DD (Device Description), EDD (Enhanced Device Description) as well as FDI Device Packages are used. Especially in the case of the standards EDD and DTM, supplementally to device parameters, device functionality and address space occupation, also graphic features and graphical user interfaces are specified for facilitating the parametering and configuring of the field devices. For producing these graphical interfaces, the standard EDD provides special graphical commands, which are executed in the manner of an interpreter language.

In the standard FDT/DTM, the DTMs (Device Type Managers) are provided in the form of dynamically loadable libraries (DLLs) or in the form of executable files (executables). A DTM includes also the mentioned graphic features. The different DTMs of the different components of the fieldbus network are integrated into a shared FDT frame application, wherein FDT stands for "Field Device Tool". Thus, a shared frame application is provided, into which the DTMs of different devices and different manufacturers can be integrated.

The FDT standard is recently being increasingly supplemented by the standard, FDI Device Packages, and will later possibly be replaced by such.

Besides the previously discussed fieldbus protocols, Profibus, Fieldbus Foundation and HART, the so-called industrial Ethernet protocols are being increasingly adopted, to which, among others, the fieldbus protocols, EtherNet/IP, ProfiNet and EtherCAT, belong.

In the case of the fieldbus protocol, EtherNet/IP, a device description file corresponding to the standard EDS (Electronic Data Sheet) is provided for description of both cyclic as well as also acyclic data exchange.

In the example of FIG. 1, the device access software 108 includes a frame application 109, wherein into the frame application 109 can be integrated different Device Type Managers (DTMs), thus drivers for the different devices and components of the fieldbus network 100. In such case, DTMs from different manufacturers can be integrated. Moreover, it is also possible to integrate other device description files into the frame application 109. For description of the fieldbus network 100, for example, a number of different device DTMs, gateway DTMs and communication DTMs can be integrated into the frame application 109. In such case, the hierarchical structure of the fieldbus network 100 is, using drivers, or device description files, recreated within the device access software 108. The arrangement of the drivers, or device description files, is, in such case, a mirror image of the structure of the fieldbus network 100. At the uppermost position of the DTM hierarchy is the communication DTM 110. The communication DTM 110 is linked with the field access device 101 and communicates with such via the Ethernet connection 106. The communication DTM 110 represents, in certain respects, the external interface of the device access software 108. All in- and outgoing data traffic passes through the communication DTM 110.

The device DTM 111 is arranged in the DTM hierarchy below the communication DTM 110 and maps the functionality of the field device 102. Arranged at the same level below the communication DTM 110 is a gateway DTM 112, which is linked with the gateway 103. Via the gateway DTM 112, the gateway 103 can be parametered and configured. Arranged beneath the gateway DTM 112 in the DTM hierarchy are two device DTMs 113, 114. The device DTM 113 maps the functionality of the field device 104, and the device DTM 114 maps the functionality of the field device 105. Besides the standard FDT/DTM, there are a number of alternative standards for the device access software and the device drivers integrated therein.

Figure 2:
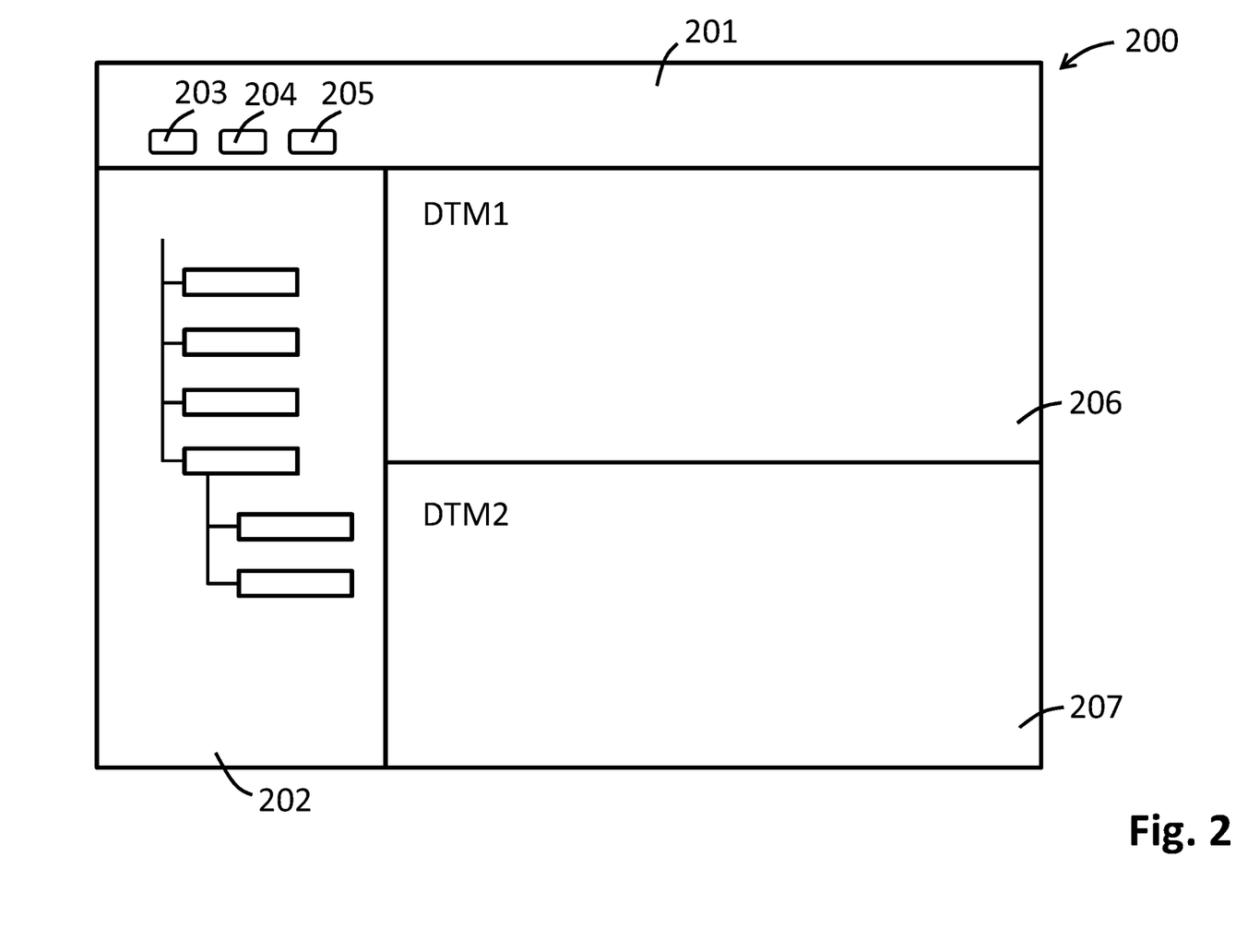
FIG. 2 shows a graphical user interface of the device access software.

FIG. 2 shows the graphical user interface 200 of the device access software 108, which is displayed, for example, on a screen or display of a PC, a tablet, a laptop, a mobile telephone or other mobile end device. Via this graphical user interface 200, the individual field devices and components of the fieldbus network 100 can be accessed. For example, the status as well as individual parameters of the different field devices can be queried. Moreover, parametering and configuring of the individual field devices and other components of the fieldbus network 100 can be performed via the graphical user interface 200.

As can be detected based on FIG. 2, the graphical user interface 200 of the device access software 108 includes a display region for the frame application 109, which can comprise, for example, a menu bar 201 as well as a tree representation 202 of the total fieldbus network, wherein a plurality of buttons 203 to 205 are arranged in the menu bar 201. Moreover, the graphical user interface 200 can, however, also comprise one or more display window 206, 207 of the individual drivers, wherein an interaction with the individual DTMs integrated into the frame application 109 can occur via these display windows 206, 207. For example, displayed in the display windows 206, 207 can be status data and parameters of the individual DTMs. Moreover, the opportunity is provided for the user to make changes to the particular configurations of the DTMs.

There are situations, in which during ongoing operation of the device access software 108, it is desirable to change the display mode of the graphical user interface 200, for example, in order to match the graphical user interface 200 to changed conditions or requirements. For example, the user might want to change from input via keyboard and mouse of a stationary PC to input via the touch display of a tablet or mobile end device, for example, in order directly to configure a particular field device anew on-site. In this case, it would be desirable to be able to switch the display mode during ongoing operation from a display suitable for PC input to a display suitable for input via touch display, wherein in the touch mode, for example, the different icons and display fields are shown enlarged, in order that a simple touch operation is enabled. The switching should be possible during run time, without, for instance, having to restart the frame application 109 and the drivers integrated therein. In such case, the switching of the display mode should include both the display region of the frame application 109 as well as also the different display windows 206, 207 of different drivers. In such case, the switching of the display mode can be triggered either by actuating one of the buttons 203 to 205 or by a predefined event.

Figure 3:
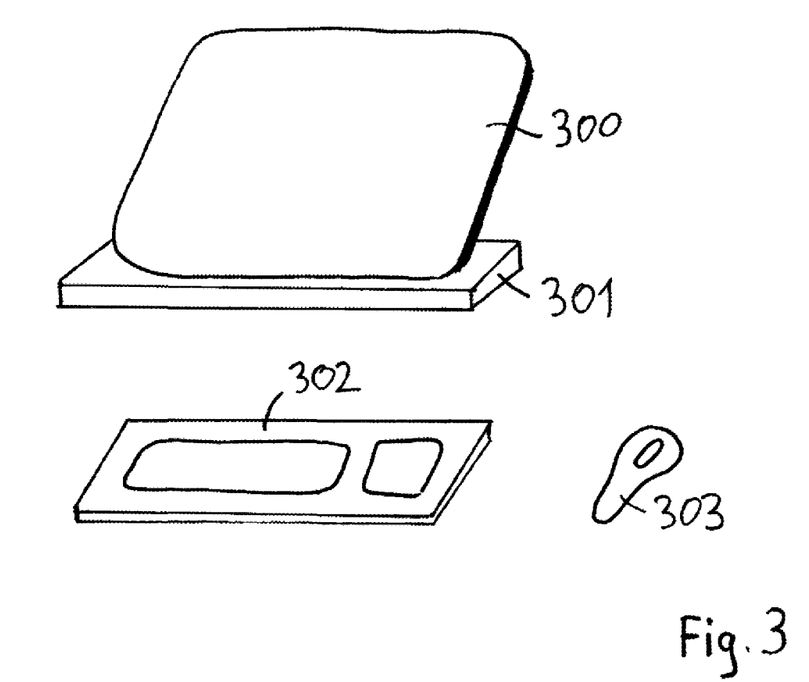
FIG. 3 shows pluggable into a docking station, a tablet, which can be interacted with selectively by means of keyboard and mouse or via touch input.

For example, shown in FIG. 3 is a tablet 300, which is set in a docking station 301 and in the docked state can be operated via the keyboard 302 and the mouse 303. In the docked state, the tablet 300 is in the non-touch mode. As soon as the tablet 300 is removed from the docking station 301, the display mode is switched to the touch mode, wherein the presentation is changed to a size suitable for touch inputs. By the docking and undocking, thus the display mode of the tablet 300 is switched between the touch mode and the non-touch mode.

Alternatively to the switching between touch mode and non-touch mode, there are yet more situations, in which a switching between different display modes can be useful. For example, a tablet can be held and operated either in landscape or in portrait mode. Thus, there could be a switching between a display mode suitable for a landscape presentation and a display mode suitable for a portrait presentation as a function of the orientation shown by the inclination sensor of the tablet, wherein a change of the orientation during run time of the FDT frame application and the drivers integrated therein triggers a corresponding switching of the display mode.

Moreover, it could be helpful to adapt the presentation on the graphical user interface 200 as a function of the available display size for the display. In this case, the frame application 109 would read out the display size from the system settings of the utilized hardware and select the display mode as a function of the ascertained display size. Alternatively thereto, the size of the presentation could be changed by actuating one of the buttons 203 to 205.

Moreover, an option would provide switching between different display modes as a function of the environmental brightness, wherein the environmental brightness would be registered, for example, by means of a brightness sensor. In the case of poor illumination, accordingly a higher contrast and brighter display mode would be used. Also in this case, the switching could alternatively be performed via one of the buttons 203 to 205.

The display modes selectable by the user can also involve, for example, different color schemes of the presentation, between which the user can switch during run time dependent on his or her personal preferences and possibly also as a function of environmental conditions.

Likewise during run time, a switching between different language versions can occur. In this way, the presentation on the graphical user interface can be changed during run time and adapted for different users.

For switching the display mode of the graphical user interface 200 during run time in accordance with forms of embodiment of the present invention, it is provided that both the display mode in the display region of the frame application 109 as well as also the display mode in the display windows 206, 207 of the different drivers are changed together.

In this way, a presentation on the graphical user interface is achieved, wherein the display regions of the frame application and at least the drivers, which support this change, are displayed in the same display mode. When at a later point in time a further driver is started and a display window for this driver is opened, then the initializing of this newly started driver occurs corresponding to the current display mode.

Figure 4:
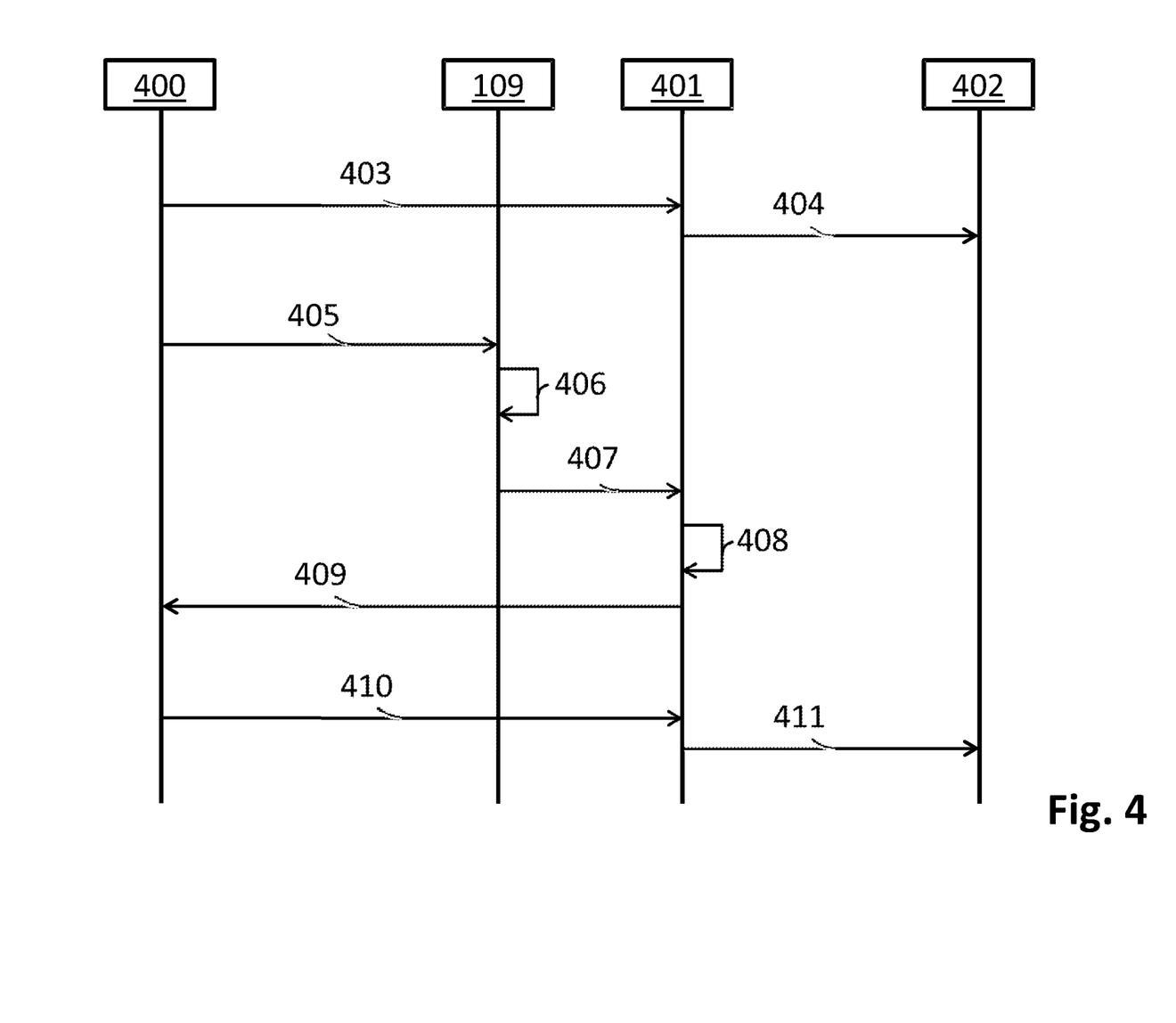
FIG. 4 shows an example of communication steps in the case of coordinated switching of the display mode of the frame application and the drivers.

FIG. 4 represents an overview of the total course of the communication for performing this coordinated switching of the display mode. Participating in this communication are the user 400, the frame application 109, a driver 401 (with user interface and processing logic) as well as a field device 402. FIG. 4 shows the total course of the communication for the example of switching from the non-touch mode into the touch mode.

First, the frame application 109 and the driver are located in the non-touch mode. Accordingly, the graphical user interface is set both for the frame application 109 as well as also for the driver shown in this case to a resolution suitable for the PC screen. Corresponding to the arrow 403, the user 400 can interact with the driver 401 using keyboard and mouse and can, for example, adjust value ranges. The data are written to the field device 402, corresponding to the arrow 404.

In step 405, the user 400 activates the touch mode by, for example, actuating one of the buttons 203 to 205 in the display region of the frame application 109. Thereupon, in step 406, the display mode of the frame application 109 is switched from the non-touch mode to the touch mode. Accordingly, the display in the display region of the frame application 109 is changed to a larger presentation.

Next, it is necessary to switch the display mode also in the display windows 206, 207 of the drivers from the non-touch mode into the touch mode. For this, the drivers are caused by the frame application 109 to switch their display modes correspondingly. This switching of the display modes of the drivers can be performed for all drivers and other application software components instantiated in the device access software. Especially in the case of more comprehensive fieldbus systems, this is, however, very time-consuming. Thus, from the point of view of minimizing what needs to be done, it is advantageous to perform a switching of the display mode only for those drivers, which are currently displayed in display windows 206, 207. Information concerning the currently active display window 206, 207 can be obtained by the frame application 109 from one or more driver management components, which are part of the frame application 109. The at least one driver management component manages the drivers, or DTMs, integrated in the frame application 109 and tracks, which drivers are open at the moment. Thus, the frame application 109 can by querying the at least one driver management component obtain information concerning which display windows 206, 207 are currently open. The switching of the display mode is then only performed for the currently opened drivers. This significantly lessens the time consumed.

Thus, depending on form of embodiment, either for all instantiated drivers or, however, preferably only in the case of currently opened drivers, a switching from the non-touch mode into the touch mode is initiated. The switching of the drivers occurs preferably via a standard interface, via which each of the drivers communicates with the frame application 109. Provided in this standard interface is a comprehensive parameter set for the different functions of the particular component of the fieldbus system, for which the driver is responsible. Provided in this standard interface can be, for example, a parameter "TouchModeEnabled", with which the display mode of a particular driver in a particular display window 206, 207 can be set. For reparametering this parameter "TouchModeEnabled", the frame application 109 queries, firstly, a particular driver by means of a query function, whether the particular driver supports the parameter, "TouchModeEnabled". In case the particular driver is embodied for a changing of the display mode, the query function returns that the parameter, "TouchModeEnabled" exists. When the parameter does not exist, it returns that the particular driver is not embodied for such a changing of the display mode.

After the frame application 109 has received the replies of the different drivers, the frame application 109 in step 407 in the case of those drivers, which support a switching of the display mode, sets the value of the parameter "TouchModeEnabled" to the value for the touch mode. Thereupon, in step 408, in the case of those drivers, which are embodied for such a switching, the display mode switches to the touch mode. Accordingly, in the display windows 206, 207, the layout, the size of the font and buttons are adapted for the touch mode. Correspondingly, in step 409, the user 400 is now presented with a unified graphical user interface 200, in which both the display region for the frame application 109 as well as also the display windows 206, 207 of the currently opened drivers are switched to a presentation suitable for the touch mode, so that the user 400 can provide inputs per touch operation both in the display region of the frame application 109 as well as also in the individual display windows 206, 207 for particular drivers.

Corresponding to the arrow 410, the user 400 can now interact with the driver 401 using touch inputs and, for example, adjust value ranges. The data are then written to the field device 402, as shown by the arrow 411.

The invention claimed is:

1. A method for changing a display mode of a device access software, comprising:
providing a device access software including a plurality of different driver and application software components integrated into a frame application, and further including an interface between the frame application and the plurality of different driver and application software components, wherein a device type manager (DTM) is provided for each of the plurality of different driver and application software components;
changing a device parameter in a corresponding one of the different driver and application software components using a user interface;
in response to changing the device parameter, switching the frame application from a first display mode into a second display mode different from the first display mode, wherein the second display mode corresponds to a selected display presentation and is illustrated in a display region of the frame application;
after the switching step, querying, by the frame application, each DTM to determine when the DTM supports a parameter for display mode; and
for each DTM of the plurality of different driver and application software components, when the DTM supports the parameter for display mode, automatically changing, by the frame application, a parameter in a corresponding one of the plurality of different driver and application software components via the interface in coordination with the switching of the frame application, wherein the changing of the at least one parameter effects a switching of the display mode from the first display mode into the second display mode in the corresponding one of the plurality of different driver and application software components, wherein the selected display presentation is illustrated in a display window of the at least one of the plurality of different driver and application software components.

2. The method as claimed in claim 1, wherein the switching occurs during a run time of the frame application and the at least one software component.

3. The method as claimed in claim 1, wherein the device access software includes a graphical user interface having a display region for the frame application and at least one display region for the at least one software component integrated into the frame application, and wherein the display region for the frame application and the at least one display region for the at least one software component integrated into the frame application are switchable from the first display mode into the second display mode.

4. The method as claimed in claim 1, wherein the at least one software component corresponds to one or more of the standards: DTM, DD, EDD, EDS, and FDI Device Packages, and is integratable into the frame application.

5. The method as claimed in claim 1, wherein the frame application is an FDT frame application and the at least one software component of the standard, DTM, is integratable into the FDT frame application.

6. The method as claimed in claim 1, wherein the frame application is an FDT frame application and the interface between the frame application and the at least one software component is an FDT interface.

7. The method as claimed in claim 1, wherein the interface between the frame application and the at least one software component is a separate interface of the frame application for the at least one software component.

8. The method as claimed in claim 3, wherein the graphical user interface of the device access software includes at least one button with which the display mode is switchable, and the change of the display mode is triggerable by actuating the at least one button, or the change of the display mode is triggerable by an event registered by the device access software.

9. The method as claimed in claim 1, further comprising:
determining, using the interface, whether the at least one software component supports switching from the first display mode into the second display mode; and
when switching from the first display mode into the second display mode is supported by the at least one software component, changing via the interface at least one parameter of the at least one software component for switching from the first display mode into the second display mode.

10. The method as claimed in claim 9, wherein a corresponding change of the at least one parameter of the at least one software component for switching from the first display mode into the second display mode is performed only when the at least one software component is currently shown in the graphical user interface.

11. The method as claimed in claim 10, wherein the frame application obtains information concerning the at least one software component currently shown in the graphical user interface from a driver management component of the frame application.

12. The method as claimed in claim 1, wherein the device access software is installed in a host having a touch display, and wherein the host is at least one of the following: a mobile device, a mobile telephone, a tablet computer, a PDA, a computer, laptop, a data eyeglasses, and a smart watch.

13. The method as claimed in claim 1, wherein the first display mode is a non-touch mode and the second display mode is a touch mode, and the touch mode enables a graphical presentation adapted for a touch display and the non-touch mode has a graphical presentation suitable for input with keyboard and mouse, and wherein a display mode is selected corresponding to information delivered from a docking station of a mobile end device concerning whether the mobile end device is or is not in the docking station.

14. The method as claimed in claim 1, wherein the first display mode is adapted for a portrait display orientation and the second display mode is adapted for a landscape display orientation, wherein the first display mode or the second display mode are in part set corresponding to orientation values registered by an inclination sensor of a mobile end device.

15. The method as claimed in claim 1, wherein the first display mode and the second display mode are adapted for different display sizes of an end device, and a display size appropriate for the end device is read-out from the end device.

16. The method as claimed in claim 1, wherein the first display mode and the second display mode are adapted for different environmental brightnesses, and a display mode is set corresponding to brightness values registered by a brightness sensor.

17. The method as claimed in claim 1, wherein the first and second display modes are different display modes for different language versions.

18. The method as claimed in claim 1, wherein the first and the second display mode have different color schemes.

19. A device access software with which components of a fieldbus system can be accessed, comprising:

a frame application, wherein the device access software includes a plurality of different driver and application software components integrated into the frame application; and an interface between the frame application and the plurality of different driver and application software components, wherein a device type manager (DTM) is provided for each of the plurality of different driver and application software components;

a user interface facilitating user communication with a corresponding one of the different driver and application software components;

wherein a device parameter is changeable in a corresponding one of the different driver and application software components using the user interface;

in response to changing the device parameter, the frame application is switchable from a first display mode into a second display mode different from the first display mode, wherein the second display mode is different from the first display mode, wherein the second display mode corresponds to a selected display presentation and is illustrated in a display region of the frame application;

wherein, after the switching to the second display mode, the frame application queries each DTM to determine when the DTM supports a parameter for the display mode, wherein the frame application is embodied in the case of a change of the display mode to automatically change at least one parameter in the at least one software component via the interface, and wherein, for each DTM of the plurality of different driver and application software components when the DTM supports the parameter for display, for each DTM of the plurality of different driver and application software components the change of the at least one parameter is coordinated with the change of the frame application and effects a switching of the display mode from the first display mode into the second display mode in the corresponding one of the plurality of different driver and application software components, wherein the selected display presentation is illustrated in a display window of the at least one of the plurality of different driver and application software components.

* * * * *